United States Patent [19]

Fukui

[11] Patent Number: 5,323,212
[45] Date of Patent: Jun. 21, 1994

[54] COPIER HAVING AN INTERMEDIATE TRAY

[75] Inventor: Tomonori Fukui, Chiba, Japan

[73] Assignee: Ricoh Company, Ltd., Tokyo, Japan

[21] Appl. No.: 951,403

[22] Filed: Sep. 24, 1992

[30] Foreign Application Priority Data

Sep. 25, 1991 [JP] Japan .................................. 3-245973

[51] Int. Cl.$^5$ ........................................... G03G 15/00
[52] U.S. Cl. .................................. 355/206; 355/311;
355/319; 271/3; 271/65; 271/902
[58] Field of Search ............... 355/243, 311, 313, 314,
355/319, 206; 271/3, 3.1, 65, 163, 902

[56] References Cited

U.S. PATENT DOCUMENTS 4,682,877   7/1987   Fujiwara et al. .................... 355/243

FOREIGN PATENT DOCUMENTS

2-8158    1/1990   Japan .................................. 355/311
2-56385   2/1990   Japan .................................. 355/314

*Primary Examiner*—Joan H. Pendegrass
*Attorney, Agent, or Firm*—Cooper & Dunham

[57] ABSTRACT

A copier includes reporting means and suppressing means for suppressing a report by the reporting means. Assume a case wherein the number of paper sheets accommodatable in an intermediate tray changes if the document laid on the glass platen is changed in position. Then, the suppressing means suppresses the report by the reporting means. When the desired number of copies is greater than the number accomodatable in the intermediate tray, the copier interrupts and prompts the operator to decide whether or not to produce a smaller number of copies. Specifically, the copier displays the number of sheets which can be received in the intermediate tray and urges the operator to press a start key again if he agrees to the smaller number of copies.

4 Claims, 10 Drawing Sheets

COPIER HAVING AN INTERMEDIATE TRAY

BACKGROUND OF THE INVENTION

The present invention relates to a copier of the type having an intermediate tray.

A conventional copier of the type disclosed in, for example, Japanese Patent Laid-Open Publication (Kokai) No. 61140/1986 and Japanese Utility Model Laid-Open Publication No. 128566/1988 has a body for reproducing a document laid on a glass platen on a paper sheet, paper selecting means for selecting paper sheets, magnification changing means for changing a magnification of the body, and reporting means for reporting the operator of a condition wherein a copying operation would be effected more effectively if the document on the glass platen were changed in position with respect to the longitudinal and lateral directions. Let this type of copier be referred to as Type I copier. Another conventional copier, or Type II copier, has a body for feeding paper sheets from a paper feed device to a register position and reproducing a document laid on a glass platen on a particular number of paper sheets from the register position entered on an operating section, paper selecting means for selecting the paper sheets, magnification setting means for setting a magnification of the body, and an intermediate tray for stacking paper sheets each carrying an image formed by the body on one side thereof and refeeding them to a register position to form images on the other side. Still another conventional copier, or TYPE III copier, is disclosed in Japanese Patent Laid-Open Publication No. 106132/1978 and constructed to sense a document size prior to a copying operation, determine a necessary paper size on the basis of the document size and a magnification, and automatically select, if paper sheets of the determined size exist in a paper feed section, such paper sheets or, if otherwise, interrupt or end the copying procedure.

A further conventional copier, or Type IV copier, assigns to each copy mode a particular paper transport path and a particular position where a paper sheet waits (or is accommodated in an intermediate tray). Specifically, (1) in a composite or combination copy mode, a paper sheet is directly transported to a register position. (2) In a two-sided copy mode effected with a single paper sheet, the paper sheet carrying an image on one side thereof is turned over by a turning section, transported to the register position, and then fed from the register position to form an image on the other side thereof. (3) In a two-sided copy mode effected with a plurality of paper sheets, the paper sheets are sequentially stacked on an intermediate tray included in the turning section and without being steered to the register position. In an interrupt copy mode for effecting interrupt copying while a composite mode or a two-sided copy mode operation is under way, the copying operation under way is interrupted and then resumed after another copying operation has been executed. In the above modes (1) and (2), since a paper sheet exists at the register position at the end of the first copying operation, an image cannot be reproduced on another paper sheet. In these modes, therefore, after the first copying operation, the interrupt copy mode is inhibited so long as the paper sheet exists at the register position.

The problem with the Type II copier described above is that in the two-sided copy mode the set or desired number of copies should not be greater than the number of paper sheets accommodatable in intermediate tray. Hence, when the number of paper sheets accommodatable in the intermediate tray changes with the size or orientation of a document, e.g., when the document is laid on the glass platen in a different position with respect to the longitudinal and lateral directions as in the Type I copier, the set number of copies has sometimes to be changed in matching relation to the number of paper sheets accommodatable in the tray. If the set number of copies were not changed, the actual number of copies produced by the copier would be short of the set number of copies, or more than the number of paper sheets accommodatable in the intermediate tray would be received in the tray. The Type III copier also has to limit the set or desired number of copies to the number of paper sheets accommodatable in the intermediate tray or less. However, when the number of paper sheets accommodatable in the intermediate tray changes with the paper size, the Type III copier does not allow the operator to enter a desired number of copies since which paper size is selected is not known until the document size has been sensed.

In the light of the above, two different approaches have heretofore been proposed, i.e., one which limits the maximum set number of copies to the number of paper sheets particular to a paper size which would minimize the number of paper sheets accommodatable in the intermediate tray, and one which reproduces only the same number of copies as the number of paper sheets accommodatable in the intermediate tray by ignoring the set number of copies. However, the former approach is disadvantageous in that even when the paper size allows a greater number of paper sheets to be received in the intermediate tray, the productivity of copies is low. The problem with the latter approach is that the user is apt to overlook the fact that the number of copies actually produced is short of the set number of copies.

Further, the Type IV copier inhibits the interrupt copy mode every time the first copying operation ends and so far as a paper sheet exists at the register position. This often prevents the interrupt copy mode from being executed depending on the desired copy mode and the desired number of copies, also lowering the productivity and, in addition, confusing the operator.

SUMMARY OF THE INVENTION

It is therefore an object of the present invention to provide a copier which prevents the actual number of copies from being short of the set number of copies even when a document is changed in position, prevents more than the number of paper sheets accommodatable in an intermediate tray to be accommodated in the tray, insures high productivity of copies, and prevents the operator from overlooking the actual number of copies which cannot be greater than the number of copies accommodatable in the intermediate tray while freeing the operator from confusion.

In accordance with the present invention, a copier comprises a body for reproducing a document laid on a glass platen on a paper sheet, a paper selecting section for selecting the paper sheet, a magnification setting section for setting a magnification in which the body reproduces the document, a reporting section for reporting an operator a condition wherein a copying operation would be effected more effectively if the document were laid on the glass platen in a reversed position with respect to a longitudinal and a lateral direction thereof, an intermediate tray for accommodating a paper sheet carrying an image formed by the body in a two-sided copy mode on one side thereof, and refeeding the paper sheet for causing an image to be formed on the other side of the paper sheet, and a suppressing section for suppressing a report by the reporting section when the number of paper sheets accommodatable in the intermediate tray would change if the document on the glass platen were changed in position in the longitudinal and lateral directions thereof.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
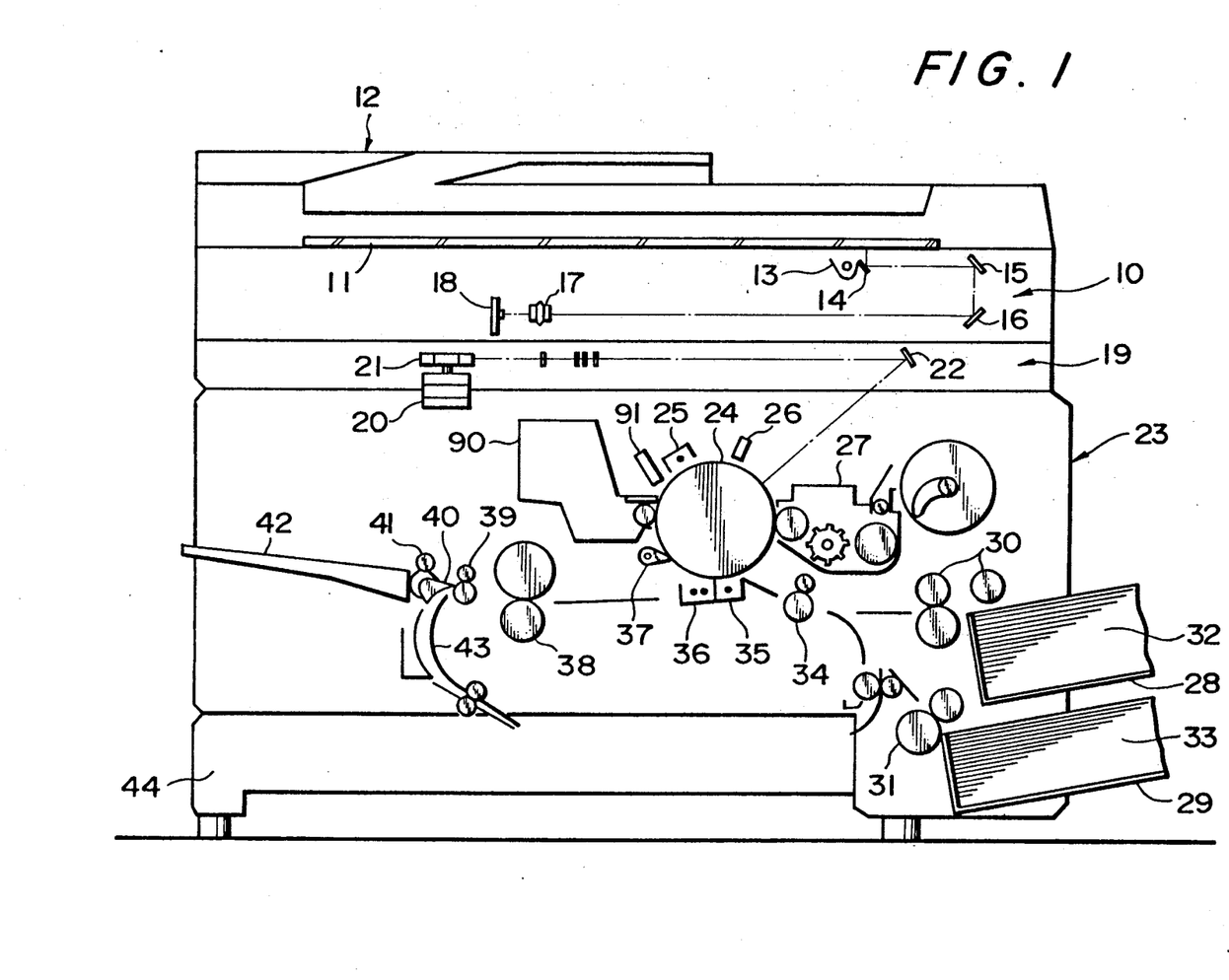
FIG. 1 is a vertical section showing a copier embodying the present invention.

Referring to FIG. 1 of the drawings, a copier embodying the present invention is shown and includes an illuminating device 10. The illuminating device has a glass platen 11 on which a document is laid by an automatic document feeder (ADF) 12 or by hand. A lamp 13 illuminates the document on the glass platen 11. The resulting reflection from the document is routed through a first mirror 14, a second mirror 15, a third mirror 16, and a lens 17 to an image reading board 18. The lamp 13 and first mirror 14 constitute a first scanner which is movable below the glass platen 11 back and forth in the left-and-right direction at a constant speed. Specifically, the first scanner scans the document in the subscanning direction while in a forward movement. The second mirror 15 and third mirror 16 constitute a second scanner. The second scanner is movable back and forth in the same direction as and at half the speed of the first scanner, scanning the document in the subscanning direction while in a forward movement. The lens 17 is fixed in place since in an enlarge mode and a reduce mode an image processing unit (IPU), which will be described, electrically processes an image signal. The image reading board 18 scans the imagewise light from the lens 17 in the main scanning direction while photoelectrically converting it. The resulting image signal from the image reading board 18 is fed to the IPU to be subjected to predetermined processing, e.g., magnification change.

A writing device 19 has a laser diode which reconverts the image signal from the IPU to light. This light is emitted as a laser beam modulated on the basis of the image signal. A deflector 21 is implemented as a polygonal mirror 21 and rotated at a constant speed by a motor 20 to deflect the laser beam issuing from the laser diode. The laser beam from the polygonal mirror 21 is incident to a photoconductive element implemented as a drum 24 and included in a recording section 23 via a mirror 22. At this instant, pixels in the main scanning direction and those in the subscanning direction are respectively implemented by the deflection of the laser beam and the rotation of the drum 24.

In the recording section 23, the drum 24 is rotated by a motor during the course of a copying operation. A main charger 25 uniformly charges the surface of the drum 24 while an eraser 26 removes the charge from needless portions of the drum 24. Then, the laser beam from the writing device 19 illuminates the charged surface of the drum 24 to electrostatically form a latent image thereon. A developing device 27 develops the latent image to produce a toner image. An upper and a lower paper cassette 28 and 29 constitute a paper feed device and store paper sheets 32 and 33, respectively. Pickup rollers 32 and 33 are associated with the paper cassettes 28 and 29, respectively. When either of the paper cassettes 28 and 29 is selected on an operation panel which will be described, the associated paper sheets 32 or 33 are fed one by one to a register roller 34 by the pickup roller 30 or 31. A size sensor is associated with each of the paper cassettes 28 and 29 for sensing the size of the paper sheets 32 or 33. After the register roller 34 has driven the paper sheet at a predetermined timing to an image transfer position, a transfer charger 35 transfers the toner image from the drum 24 to the paper sheet. Then, the paper sheet carrying the image thereon has the charge thereof dissipated by a separation charger 36 and is thereby removed from the drum 24. When the separation charger 36 fails to separate the paper sheet from the drum 24, a separator in the form of a pawl 37 separates it forcibly. A fixing device 38 fixes the image on the paper sheet and drives the paper sheet toward a discharge system including a selector or pawl 40 via a transport roller 39. After the separation of the paper sheet, the toner remaining on the drum 24 is removed by a cleaning device 90. Subsequently, the surface of the drum 24 is discharged by a discharger 91 to prepare for the next copying operation.

The recording device 23 is selectively operable in an ordinary or one-sided copy mode for reproducing an image on one side of a paper sheet, a two-sided copy mode for reproducing an image on both sides of a paper sheet, or in a composite or combination copy mode for reproducing a composite image of a plurality of documents on one side of a paper sheet. The selector 40 is actuated by a solenoid, not shown, to select a particular paper transport path matching the copy mode selected. Specifically, in the ordinary copy mode, a paper sheet carrying an image on the front thereof and transported from the fixing unit 38 via the roller 39 is steered by the selector 40 to a discharge roller 41 and therefrom to a discharge tray 42. In the two-sided copy mode, a paper sheet carrying an image on the front thereof is steered by the selector 40 to a circulation path 43 included in a two-side unit 44. In the two-sided copy mode, the two-side unit 44 turns over the paper sheet from the pawl 40 and then refeeds it to the register roller 34. While, in the composite copy mode, it directly refeeds the paper sheet from the selector 40 to the register roller 34. As a result, in the two-sided copy mode, another image is reproduced on the rear of the document in the same manner as the image on the front; in the composite copy mode, another image is formed on the front of the paper sheet in addition to the existing image. The resulting copy is driven out to the discharge tray 42.

Figure 5:
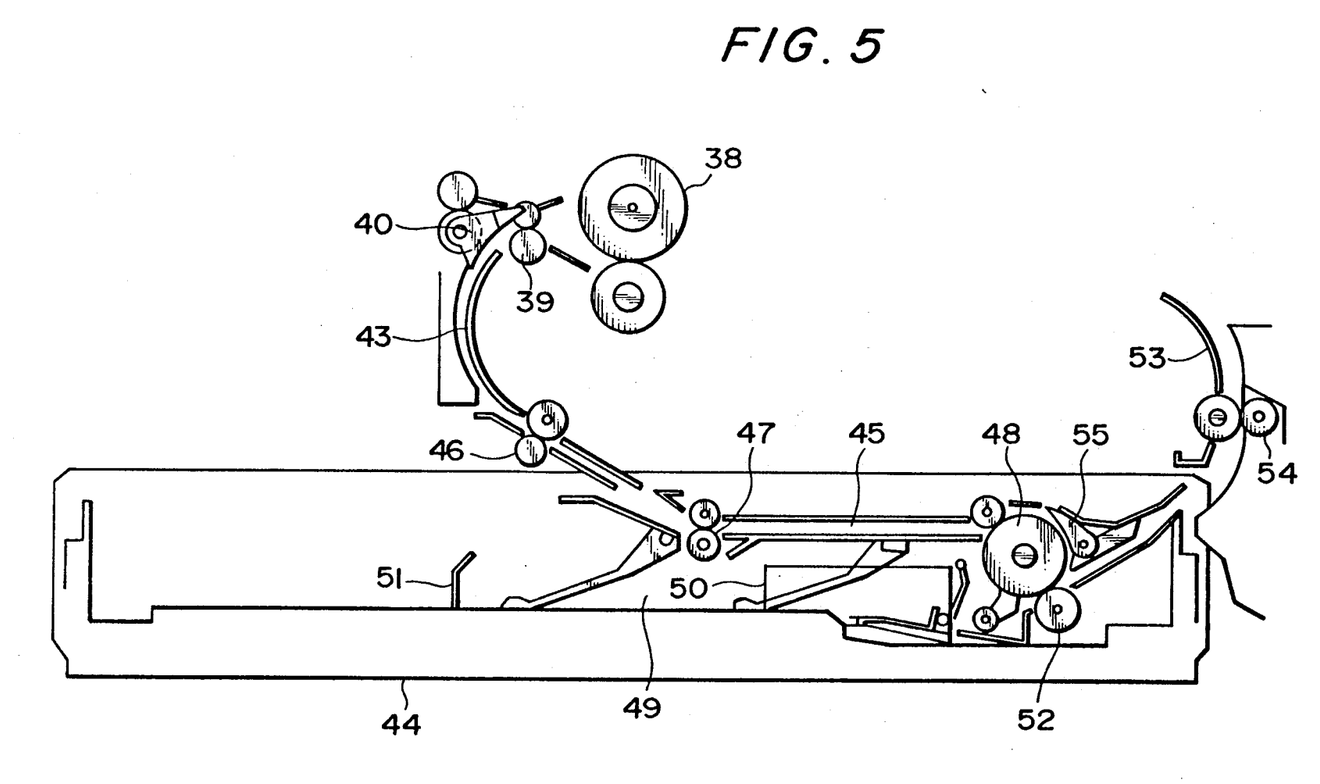
FIG. 5 is a section showing a specific configuration of a two-side unit included in the embodiment.

FIG. 5 shows a specific construction of the two-side unit 44. As shown, in the composite copy mode, the paper sheet from the selector 40 is transported along the circulation path 43 by a roller 46 and then along a path 45 by a roller 47 to reach a refeed roller 48. As a selector 55 is brought to a downward position by a solenoid, not shown, the paper sheet is directly driven toward the register roller 34. When documents are to be reproduced on a single paper sheet in the two-sided copy mode, the selector 55 is brought to an upward position by the solenoid. As a result, the paper sheet from the selector 40 is transported along the paths 43 and 45 to reach an intermediate tray 49 by way of the periphery of the refeed roller 48. As soon as the trailing edge of this paper sheet arrives at a friction roller 52, the refeed roller 48 is reversed with the result that the paper sheet is transported along a path 53 toward the register roller 34 by a roller 54.

To reproduce documents on a plurality of paper sheets in the two-sided copy mode, the selector 55 is directed upward by the solenoid, not shown, in the event of the first image formation. In this condition, the paper sheet from the selector 40 is transported to the intermediate tray 49 via the paths 43 and 45 and the refeed roller 48 and stored therein without being refed to the register roller 34. The intermediate tray 49 is provided with a jogger fence 50 movable in the left-and-right direction of the tray 49, and a jogger fence 51 movable in the front-and-rear direction of the tray 49. The paper sheet reached the intermediate tray 49 is positioned by the jogger fences 50 and 51 in the above-mentioned two directions. The paper sheet can be accommodated in the intermediate tray 49 only if its length is less than 210 millimeters as measured in the direction of transport, i.e., if it is of A4 size and fed sideways. Such paper sheets each carrying an image on the front thereof are sequentially stacked on the intermediate tray 49. It is to be noted that the tray 49 is capable of accommodating up to fifty paper sheets therein. In the event of the second image formation, the paper sheets stacked on the intermediate tray 49 are sequentially refed by the refeed roller 48 and transported along the path 53 by the roller 54 to the register roller 34.

Assume a paper sheet which is longer than 210 millimeters in the direction of transport. Then, as the trailing edge of such a paper sheet reaches the friction roller 52 by way of the periphery of the refeed roller 48, the refeed roller 48 is reversed to refeed it. As a result, the paper sheet is transported along the path 53 by the roller 54 to reach the register roller 34. Therefore, the two-sided image forming operation is effected paper by paper. The jogger fence 51 movable in the front and rear direction is so configured as to be lowered by a solenoid, not shown, as needed. The paper sheet, whether it be shorter than 210 or not, is refed from the intermediate tray 49 by the refeed roller 48 and transported to the register roller 34 along the path 53 by the roller 54.

Figure 2:
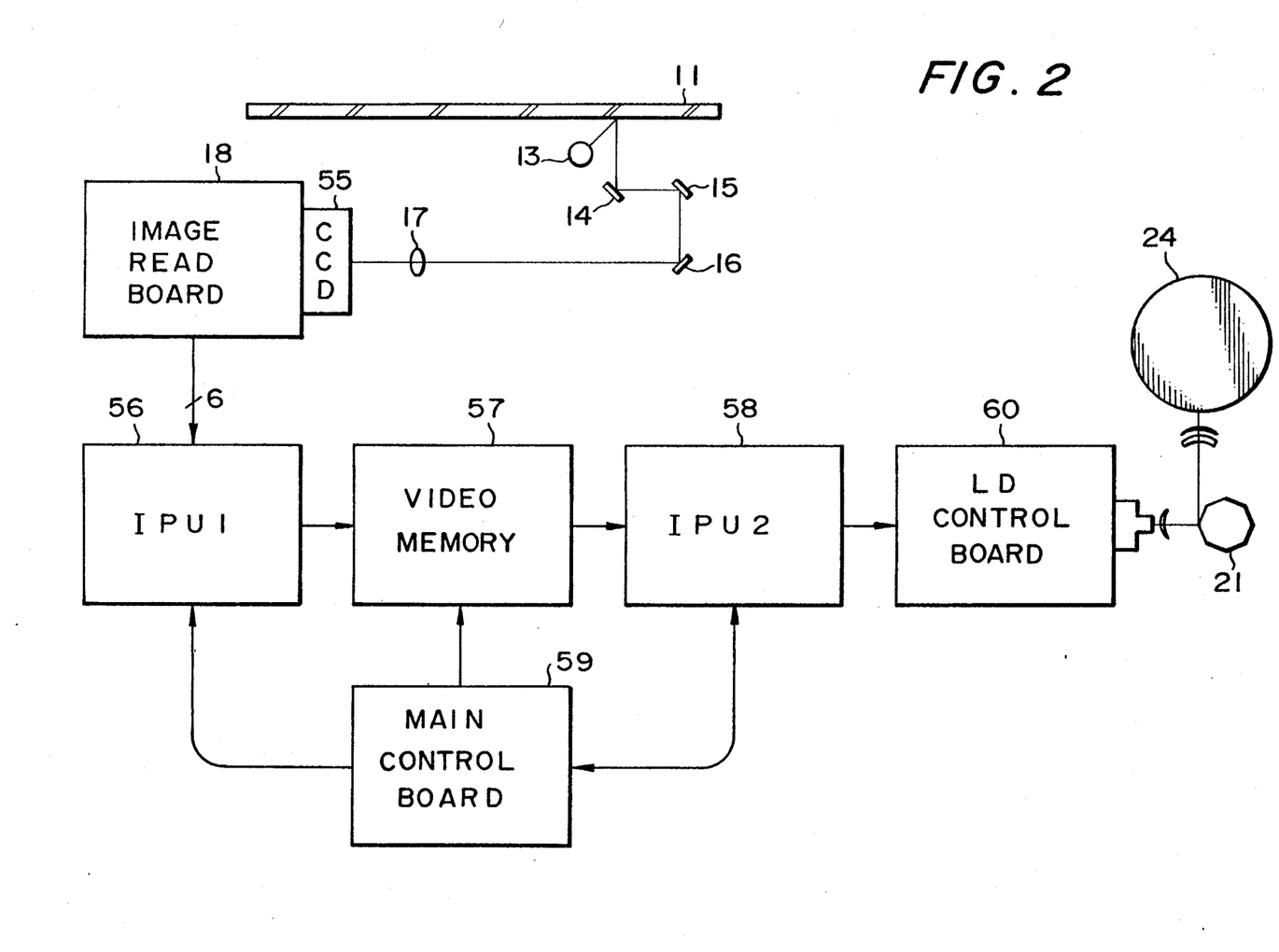
FIG. 2 is a block diagram schematically showing a control system included in the embodiment.

Referring to FIG. 2, a control system incorporated in the embodiment will be described. As shown, the reflection from the document laid on the glass platen 11 is incident to a photoelectric transducer 55 via the mirrors 14, 15 and 16 and lens 17. The photoelectric transducer 55 is provided on the image reading board 18 and implemented by a CCD (Charge Coupled Device) array. By photoelectrically converting the imagewise light from the lens 17, the transducer 55 transforms the density distribution of the image to an electric signal, i.e., image signal. In the illustrative embodiment, the transducer 55 is constituted by a 5000-pixel CCD array 55 and provided with a resolution of 400 dots per inch (dpi). An analog-to-digital converter is built in the image reading board 18 for converting the analog image signal from the CCD array 55 to a 6-bit (64 tones) parallel digital image signal. The parallel digital image signal is fed to an IPU 56. In response, the IPU 56 executes shading correction and MTF correction with the digital image signal and then write it in a video memory or RAM (Random Access Memory) 57. An IPU 58 reads the image signal out of the video memory 57 and executes various kinds of processing including magnification change, black-white replacement, and halftone processing, if necessary. The IPU 56 interchanges data with a main control board 59 which governs the entire embodiment. The kinds of image processing to be executed by the IPUs 56 and 58 are determined by commands sent from the main control board 59. By checking inputs on mode keys including a composite copy mode key 73, a two-sided copy mode key 74 and a sort mode key 75, FIG. 3, the main control board 59 causes a copying operation to occur in a particular mode selected. Further, the IPU 58 sends data derived from the image signal to the main control board 59, as needed. The image signal from the IPU 58 is delivered to an LD (Laser Diode) control board 60. In response, the LD control board 60 controls the quantity of light to issue from an LD accordingly, thereby writing the image on the drum 24. Specifically, the laser beam from the LD is steered by the polygonal mirror 21 rotating at a high speed to in turn scan the drum 24. The polygonal mirror 21 effects single main scanning with each of a plurality of faces thereof. The faces of the mirror 21 are machined with ultrahigh precision to insure an accurate writing position in both of the main and subscanning directions and to enhance efficient reflection.

Figure 3:
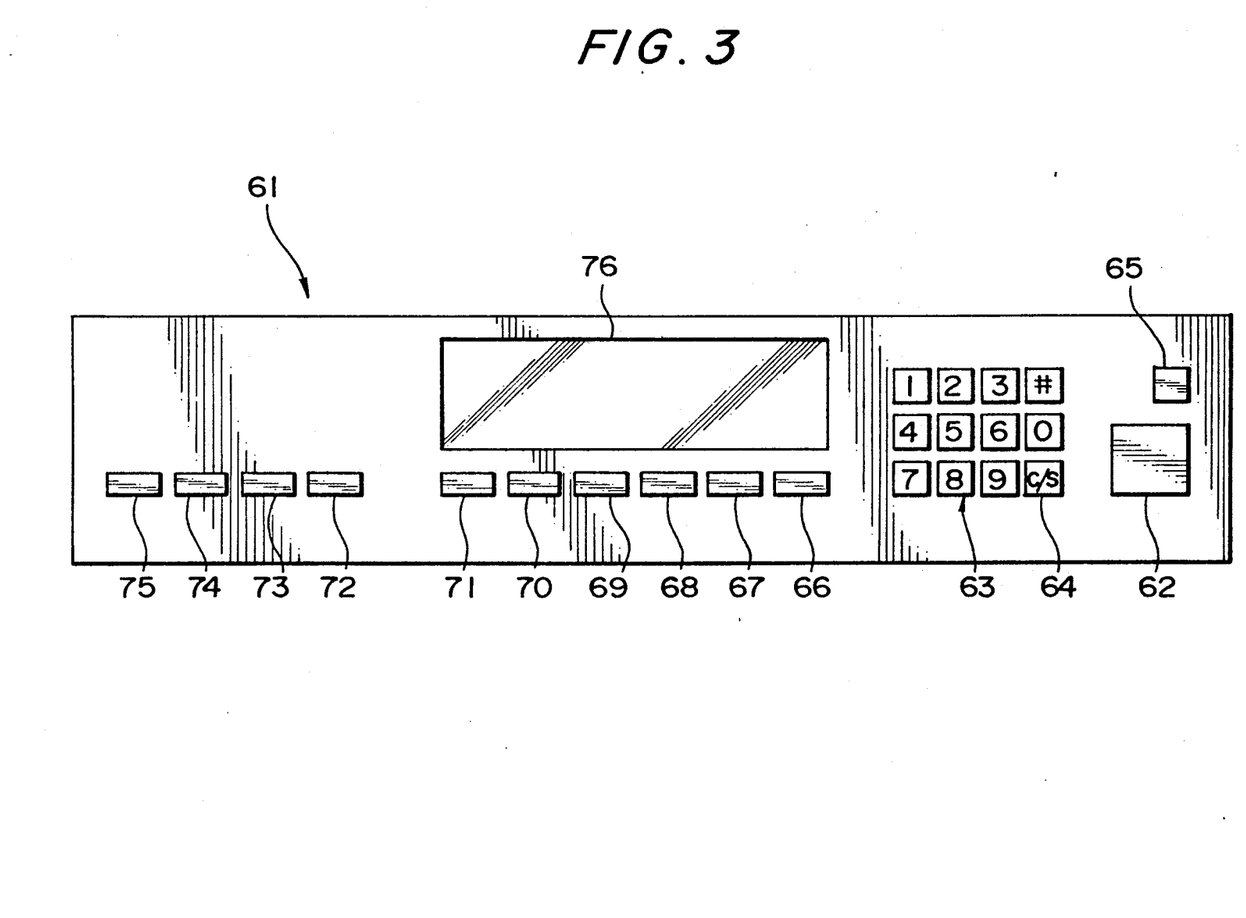
FIG. 3 is a plan view showing a specific arrangement of an operation panel included in the embodiment.

FIG. 3 shows an operation panel 61 included in the embodiment. As shown, a print key 62, numeral keys 63, a clear/stop (C/S) key 64 and an interrupt key 65 are arranged at the right-hand side on the panel 61. An automatic paper select key 66, an automatic magnification set key 67, a paper select key 68 for selecting the paper cassette 28 or 29, a x1 key 69 for setting a x1 magnification, an enlarge key 70 for increasing the magnification and a reduce key 71 for reducing the magnification are located at the left-hand side of the keys 62-65. Mode set keys including a continuous page copy mode key 72 for setting a continuous page copy mode and the previously mentioned composite copy mode key 73, two-sided copy mode key 74 and sort mode key 75 are disposed at the left-hand side of the keys 66-71. Reporting 76 is positioned at the upper center, as viewed in the figure, and implemented by an LCD (Liquid Crystal Display) for displaying various messages, statuses of the copier, number of copies, etc.

Figure 4:
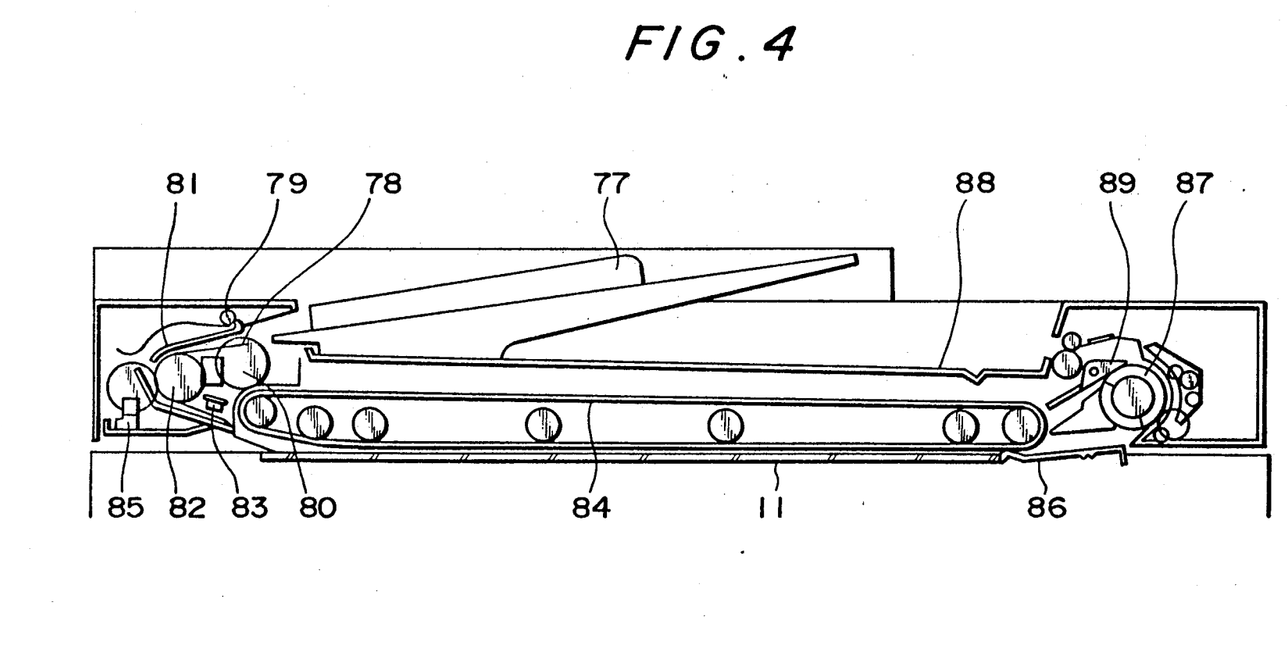
FIG. 4 is a section of an automatic document feeder (ADF) included in the embodiment.

A specific construction of the ADF 12 is shown in FIG. 4. As shown, the ADF 12 has a document tray 77. When a stack of documents are put on the tray 77, a document sensor 78 senses them. As the print key 62 is pressed, a pinch roller 79 and a pickup roller 80 contact each other. On the turn-on of a motor, not shown, the pickup roller 80 is rotated to feed one of the documents from the tray 77. The document is transported by the cooperation of a belt 81 and a roller 82. When a great number of documents are stacked on the tray 77, only one document contacting the belt 81 and roller 82 is transported, i.e., two or more documents are prevented from being fed together. The document moved away from the belt 81 and roller 82 is driven toward the glass platen 11 by a belt 84 by way of a register and width sensor 83. At this instant, a length sensor 85 and the register and width sensor 83 sense the size of the document, while the belt 84 is rotated by a motor, not shown.

When the document driven onto the glass platen 11 abuts against a stop 86, the belt 84 is brought to a stop to hold the document at a predetermined illuminating position. After the document on the glass platen 11 has been illuminated by the illuminating device 10, the stop 86 is lowered while the belt 84 and a turn roller 87 are rotated by respective motors. As a result, the document is driven out from the glass platen 11 to a tray 88 via the turn roller 87. Then, the next document is fed from the document tray 77. The stop 86 is restored to the original position after the discharge of the document. To illuminate the rear of the document, a selector or pawl 89 is raised when the document having the front thereof illuminated is to be driven out from the glass platen 11. As a result, the document from the glass platen 11 is again transported to the illuminating position on the glass platen 11 via the turn roller 87. As the rear of the document is illuminated, the selector 89 is brought to its original position with the result that the document is discharged to the tray 88.

Figure 6:
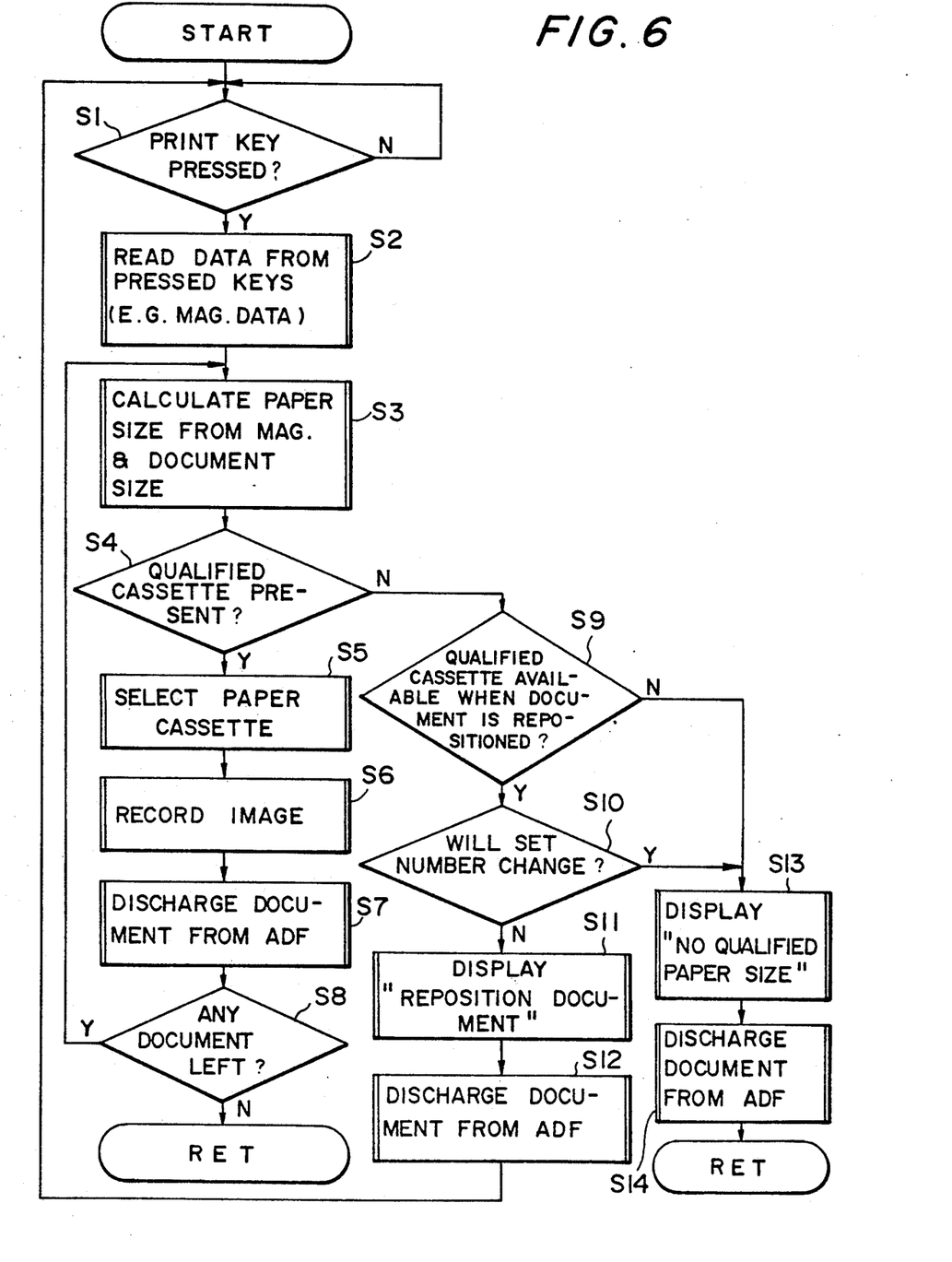
FIG. 6 is a flowchart representative of a specific automatic paper selection procedure to be executed by a main control board included in the control system.

FIG. 6 is a flowchart demonstrating a specific automatic paper selection routine which the main control board 59 executes. Assume that the automatic paper select key 66 provided on the operation panel 61 is pressed. Then, the main control board 59 sets an automatic paper select mode in response to the resulting output of the key 66 and then starts on the automatic paper selection procedure. Specifically, when the print key 62 is pressed as determined in a step S1, the control board 59 causes the ADF 12 to set a document on the glass platen 11 (S2), reads magnification data and other data which are entered on any one of the keys 69, 70, 71 and so forth, and determines the size of the document in response to the outputs of the sensors 83 and 85. In a step S3, the control board 59 determines the size of paper sheets to be used on the basis of the input on the x1 key 69, enlarge key 70 or reduce key 71 (magnification) or a magnification set by an automatic magnification set routine, which will be described, and the above-mentioned document size. In a step S4, the control board 59 determines whether or not any one of the paper cassettes 28 and 29 stores paper sheets of interest on the basis of the calculated paper size and the outputs of size sensors associated with the cassettes 28 and 29. If the answer of the step S4 is positive, Y, the control board 59 selects such a cassette (S5), controls the recording device 19 to effect the previously stated image forming operation (S6), and then causes the ADF 12 to discharge the document from the glass platen 11 to the tray 88 (S7). Subsequently, the control board 59 checks the output of the document sensor 78 to see if any other documents exist on the document tray 77 (S8). If the answer of the step S8 is positive, the program returns to the step S2. Such a procedure is repeated until the tray 77 runs out of the documents.

Assume that none of the paper cassettes 28 and 29 store paper sheets of the calculated paper size as determined in the step S4. Then, the main control board 59 executes a step S9 for determining whether or not the paper sheets stored in the paper cassette 28 or 29 will be optimum (i.e. identical in size) if the document on the glass platen 11 is changed, or reversed, in position with respect to the longitudinal and lateral directions, by referencing the calculated paper size. If the answer of the step S9 is positive, the control board 59 determines whether or not the set number of copies entered on the numeral keys 63 will be changed by the size of paper sheets stored in the paper cassette of interest (S10). Here, since the number of paper sheets that can be accommodated in the intermediate tray 49 changes with the paper size and is known beforehand, the number of copies to be entered on the numeral keys 63 is limited by the paper size. Therefore, the control board 59 executes the above decision on the basis of the relation between the number of paper sheets accommodatable in the intermediate tray 49 and the size of paper sheets stored in the paper cassette of interest. If the set number of copies will be changed by the paper size, the control board 59 displays a message on the display 76 for urging the operator to reposition (reverse) the documents with respect to the longitudinal and lateral directions (S11), causes the ADF 12 to discharge the document from the glass platen 11 (S12), and then returns to the step S1.

Assume that when the documents on the glass platen 11 is repositioned in the longitudinal and lateral directions, and that none of the paper sheets stored in the paper cassettes 28 and 29 matches the optimum size as determined in the step S9. Then, the control board 59 informs the operator of the absence of an optimum paper size with the display 76 (S13), causes the ADF 12 to discharge the document from the glass platen 11 (S14), and then returns to the step S1.

Further, when the set number of copies will be changed by the paper size as determined in the step S10, the control board 59 shows the absence of paper sheets of optimum size on the display 76 (S13), and then causes the ADF 12 to discharge the document from the glass platen 11 (S14).

For example, assume a condition wherein the document laid on the glass platen 11 is of A4 size and positioned sideways, i.e., with the longitudinal direction thereof oriented perpendicular to the scanning direction, paper sheets of A4 size are stacked with the longitudinal direction thereof oriented parallel to the scanning direction, a 100% magnification is set on the keys 69-71 of the operation panel 61, the two-sided copy mode is set on the key 74, the automatic paper selection mode is set, and a document on the glass platen 11 is to be reproduced on three paper sheets. Then, usually, the control board 59 displays a message for urging the operator to reposition the documents as in the step S11. However, when the document is of A4 size and positioned such that the longitudinal direction thereof extends parallel to the scanning direction, it is reproduced on a single paper sheet at a time. In such a case, the control board 59 informs the operator of the absence of paper sheets of optimum size as in the step S13, and stops the copying operation.

Figure 7:
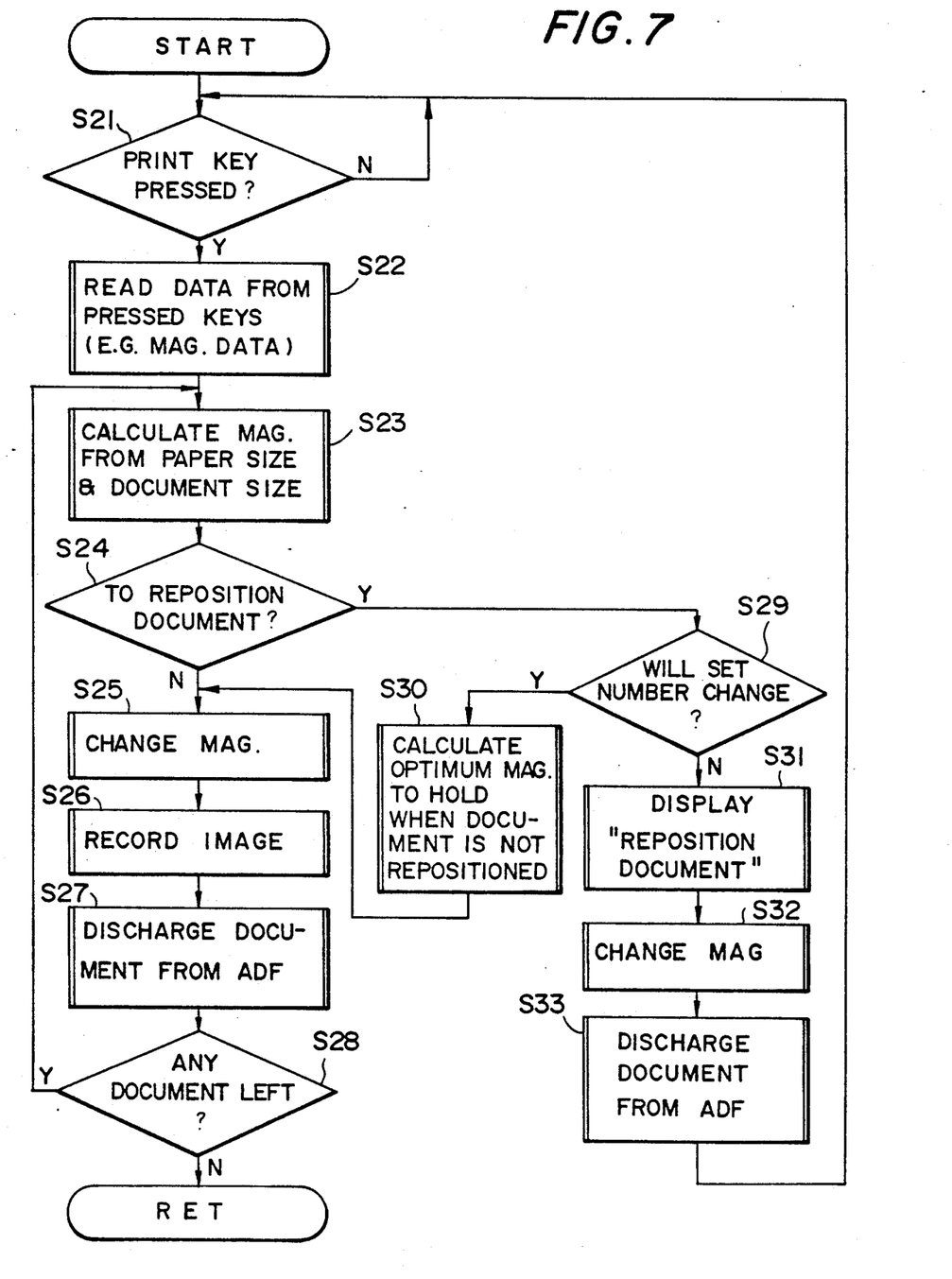
FIG. 7 is a flowchart demonstrating a specific automatic magnification set procedure to be also executed by the main control board.

Referring to FIG. 7, the automatic magnification set routine to be executed by the main control board 59 will be described. Assume that the automatic magnification set key 67 on the operation panel 61 is pressed. Then, the control board 59 sets an automatic magnification set mode in response to the signal from the key 67. In a step S21, the control board 59 checks the input signal from the print key 62 to see if the key 62 has been pressed. If the key 62 has been pressed, the control board 59 causes the ADF 12 to set a document on the glass platen 11, reads magnification data and other data from pressed ones of the keys 69-71 and so forth, and determines the document size in response to the outputs of the sensors 83 and 85 (S22). In a step S23, the control board 59 calculates, on the basis of the output signals of the size sensors associated with the paper cassettes 28 and 29 or the paper size selected by the above-stated automatic paper selection routine and the determined document size, a magnification which will be optimum when the document on the glass platen 11 is copied without the orientation thereof changed and a magnification which will be optimum when otherwise. Subsequently, in a step S24, the control board 59 determines whether the document on the glass platen 11 should be changed in position in the longitudinal and lateral directions on the basis of the calculated magnifications. If the document should not be repositioned, the control board 59 sets the calculated magnification in the IPU 58 (S25), and then controls the recording device 19 to effect image formation in such a magnification (S26). As a result, the document on the glass platen 11 is repetitively reproduced the number of times corresponding to the desired number of copies. On the completion of the reproduction, the control board 59 causes the ADF 12 to discharge the document on the glass platen 11 (S27), determines whether or not any other documents are present on the document tray 77 in response to the output of the sensor 78 (S28), and then returns to the step S22 if the answer is positive.

Assume that the document on the glass platen 11 does not have to be reoriented in the longitudinal and lateral direction as determined in the step S24. Then, the control board 59 executes a step 29 for determining whether or not the number of copies entered on the numeral keys 63 will be changed by the size of paper sheets stored in the paper cassette selected when the document on the glass platen 11 is reoriented, on the basis of a relation between the number of paper sheets accommodatable in the intermediate tray 49 and the size of paper sheets stored in the above-mentioned paper cassette (i.e. the outputs of the size sensors of the cassettes 28 and 29 or the paper size selected by the automatic paper selection procedure). If the number of copies entered will be changed, the control board 59 calculates the maximum magnification available when the document on the glass platen 11 is not repositioned on the basis of the calculated document size and the number of paper sheets accommodatable in the intermediate tray 49 (S30), and then advances to a step S25 for setting the maximum magnification in the IPU 58.

When the control board 59 determines in the step S9 that the number of copies entered will not be changed by the paper size of the paper cassette selected, it displays a message on the display 76 for urging the operator to reverse the position of the document in the longitudinal and lateral directions (S31), sets the magnification calculated in the step S22 (particular to the case of reorientation) in the IPU 58 (S32), then causes the ADF 12 to discharge the document on the glass platen 11 (S33), and then returns to the step S21.

In the illustrative embodiment, in a condition wherein a copying operation would be effected more effectively if a document were laid on the glass platen 11 with the position thereof changed in the longitudinal and lateral positions, a message for urging the operator to reposition it appears on the display 76. In the two-sided copy mode, paper sheets each carrying a document on one side thereof are refed from the intermediate tray 49 for reproducing images on the other side thereof. Assume that when the document positioned on the glass platen 11 is repositioned in the above-mentioned directions, the size of paper sheets is changed to in turn change the number of paper sheets accommodatable in the intermediate tray 49 and, therefore, the number of copies entered. In such a case, the embodiment shows a particular message on the display 76 to inform the operator of the fact that an optimum paper size will not be obtained due to the change in paper size. Hence, despite the reorientation of the document, it is possible to prevent the actual number of copies from being short of the desired number of copies and to prevent more than the number of paper sheets accommodatable in the intermediate tray 49 from being received in the tray 49.

Moreover, when the document on the glass platen 11 is repositioned as stated above, the embodiment assigns a particular magnification to each of the case where the number of paper sheets accommodatable in the intermediate tray 4 changes and the case where it does not change. This is successful in effecting a copying operation with an optimum magnification when the documents are not reoriented and the number of paper sheets accommodatable in the intermediate tray 49 does not change.

Figure 8:
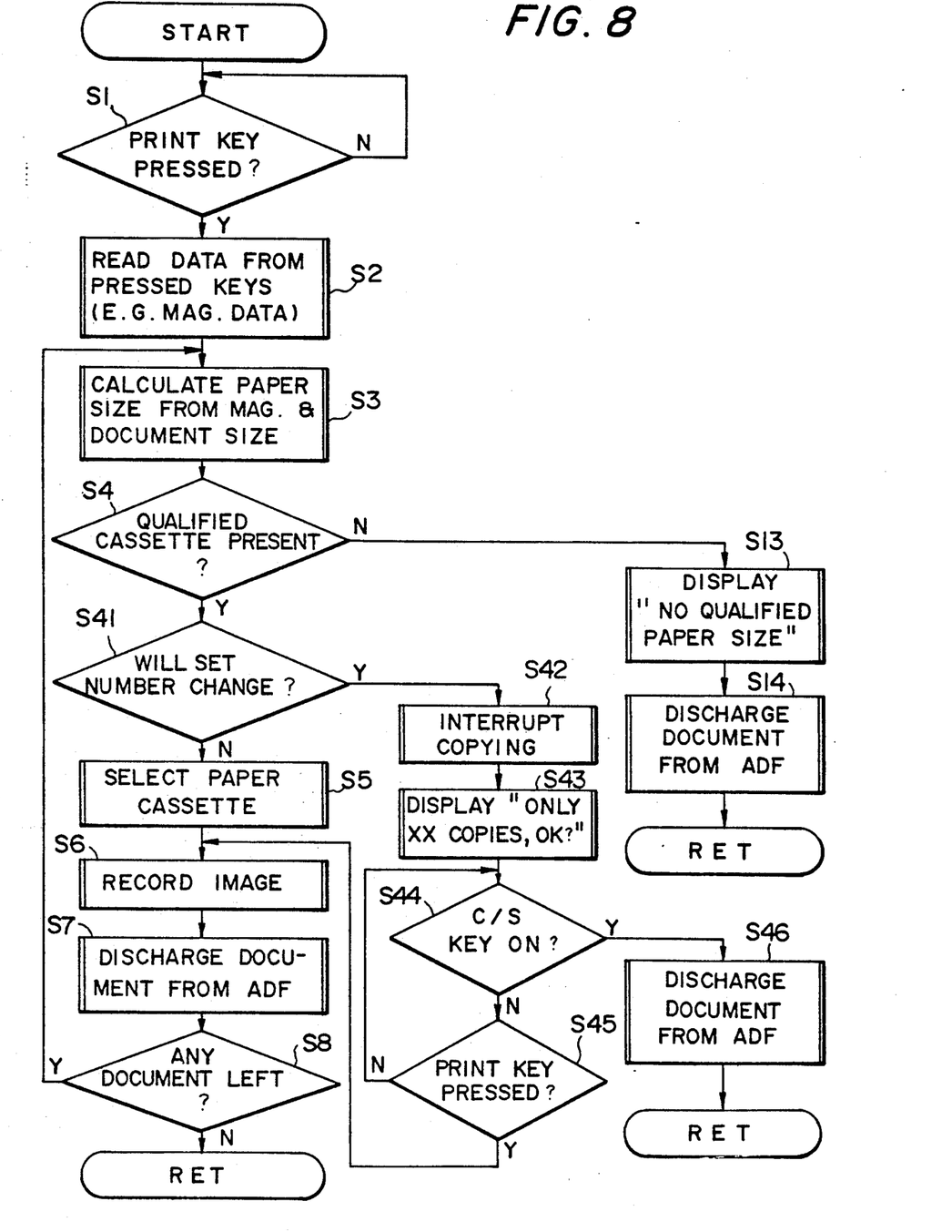
FIG. 8 is a flowchart representative of an alternative embodiment of the present invention.

FIG. 8 shows an automatic magnification set procedure representative of an alternative embodiment of the present invention. This embodiment uses a main control board 59' for executing, among others, an automatic paper selection routine in place of the above-described main control board 59. The control board 59' executes, in the same manner as the control board 59, processing other than the automatic paper selection flow of FIG. 6 and automatic magnification set flow of FIG. 7. Specifically, in the automatic paper selection flow, the control board 59' causes the ADF 12 to set a document on the glass platen 11 when the print key 62 is pressed (S2), reads data from pressed ones of the keys 69-71 and so forth, and determines the document size in response to the outputs of the sensors 83 and 85, as in the previous embodiment. In the step S3, the control board 59' calculates the size of paper sheets to be used on the basis of the input (magnification) entered on any one of the keys 69-71 and the above-mentioned document size (S3), and then determines whether or not any one of the paper cassettes 28 and 29 stores paper sheets of the determined size on the basis of the calculated paper size and the outputs of the size sensors associated with the cassettes 28 and 29 (S4). If the answer of the step S4 is positive, the control board 59 executes a step S41 for determining, on the basis of a relation between the number of paper sheets accommodatable in the intermediate tray 49 and the size of paper sheets stacked on the paper cassette of interest, whether or not the two-sided document mode has been selected and whether or not the number of copies entered on the numeral keys 63 will change due to the paper size of the cassette of interest and will exceed the number of copies accommodatable in the intermediate tray. If the entered number of copies will not be changed by the paper size or not exceed the above-mentioned number, the control board 59 controls the recording device 19 to effect image formation with the paper sheet fed from the cassette selected (S6), and then causes the ADF 12 to discharge the document on the glass platen 11 to the tray 88 (S7). Subsequently, the control board 59' references the output of the document sensor 8 to see if any other documents exist on the document tray 77 (S8). If the answer of the step S8 is positive, the control board 59' returns to the step S2 and repeats the above procedure until all the documents have been fed from the document tray 77.

Assume that none of the paper cassettes 28 and 29 stores paper sheets of the size which will be optimum when the document on the step S11 is reoriented as determined in the step S4. Then, the control board 59' displays a particular message indicating that paper sheets of optimum size are not available on the display 76 (S13), causes the ADF 12 to discharge the document on the glass platen 11 (S14), and then ends the processing.

Further, if the answer of the step S41 is positive, the control board 59' interrupts (or ends) the copying operation (S42), and then shows on the display 76 a message indicative of the fact that not more than the number of copies corresponding to the size of the paper sheets stored in the paper cassette of interest can be produced (S43). Thereafter, the control board 59' checks the input signal from the C/S key 64 to see if it has been pressed (S44). If the answer of the step S44 is negative, N, the control board 59' checks the input signal from the print key 62 (S45); if otherwise, it ends the processing after causing the ADF 12 to discharge the document on the glass platen 11 (S46). Also, when the print key 62 is pressed, the control board 59' determines that the operator has understood the number of copies to be produced which will be smaller than the set number of copies, and then advances to the step S6 for causing the recording device 19 to repeat image formation the number of times corresponding to the number of paper sheets accommodatable in the intermediate tray 49.

As stated above, the embodiment described above pertains to a copier of the type having an intermediate tray which in a two-sided copy mode, temporarily stacks paper sheets each carrying an image on one side thereof, refeeds them to reproduce images on the side, and accommodates a number of sheets which varies with the paper size. The embodiment calculates the number of paper sheets accommodatable in the intermediate tray on the basis of the result of paper selection by paper selecting means, and interrupts or ends a copying operation under way if the set number of copies is greater than the calculated number of paper sheets while reporting it to the operator. Hence, even when the paper sheets are of a size allowing a greater number of paper sheets to be stacked on the intermediate tray, it is not necessary to limit the maximum number of copies to be produced to the number particular to the paper size which minimizes the number accommodatable in the tray. As a result, the productivity of copies is enhanced. In addition, the embodiment is prevented from producing only the same number of copies as the paper sheets accommodatable in the intermediate tray by ignoring the set number of copies. Otherwise, the operator would fail to see that the actual number of copies is not greater than the number of paper sheets accommodatable in the intermediate tray.

Figure 9:
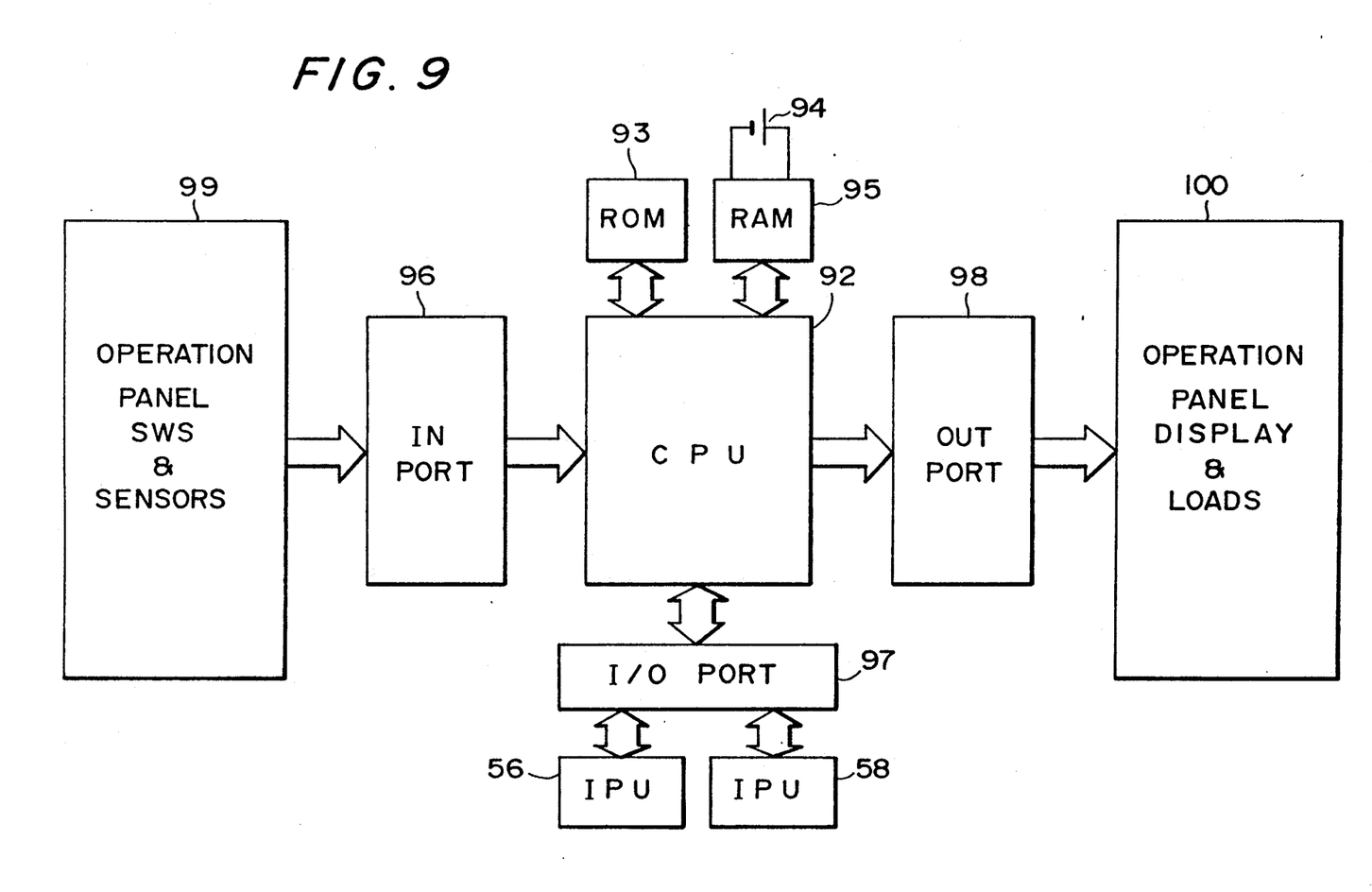
FIG. 9 is a block diagram showing circuitry representative of another alternative embodiment of the present invention.

FIG. 9 shows another alternative embodiment of the present invention. As shown, this embodiment differs from previous ones in that the main control board 59 is implemented as a microcomputer having a CPU (Central Processing Unit), a ROM (Read Only Memory) 93, a RAM (Random Access Memory) 95 backed up by a battery 94, an input (IN) port 96, an input/output (I/O) port 97, and an output (OUT) port 98. By using programs stored in the ROM 93 and, if necessary, the RAM 95, the CPU 92 reads via the input port 96 the outputs of an input section 99 constituted by the switches 62-76 of the operation panel 61 and various sensors included in the embodiment. In response, the CPU 92 controls the operation of the embodiment by outputting control signals via the output port 96 to an output section 100 which is constituted by the display 76 and other various loads included in the embodiment. At the same time, the CPU 92 interchanges data with the IPUCs 56 and 58 via the I/O port 97. Further, on receiving an interrupt request from the interrupt key 65, the CPU 92 controls the output section 100 to interrupt a job under way (copying operation in any of the copy modes), cause a copying operation in an interrupt copy mode to occur, and then restore the original copy mode to resume the job having been interrupted in response to an input on the print key 62.

Figure 10:
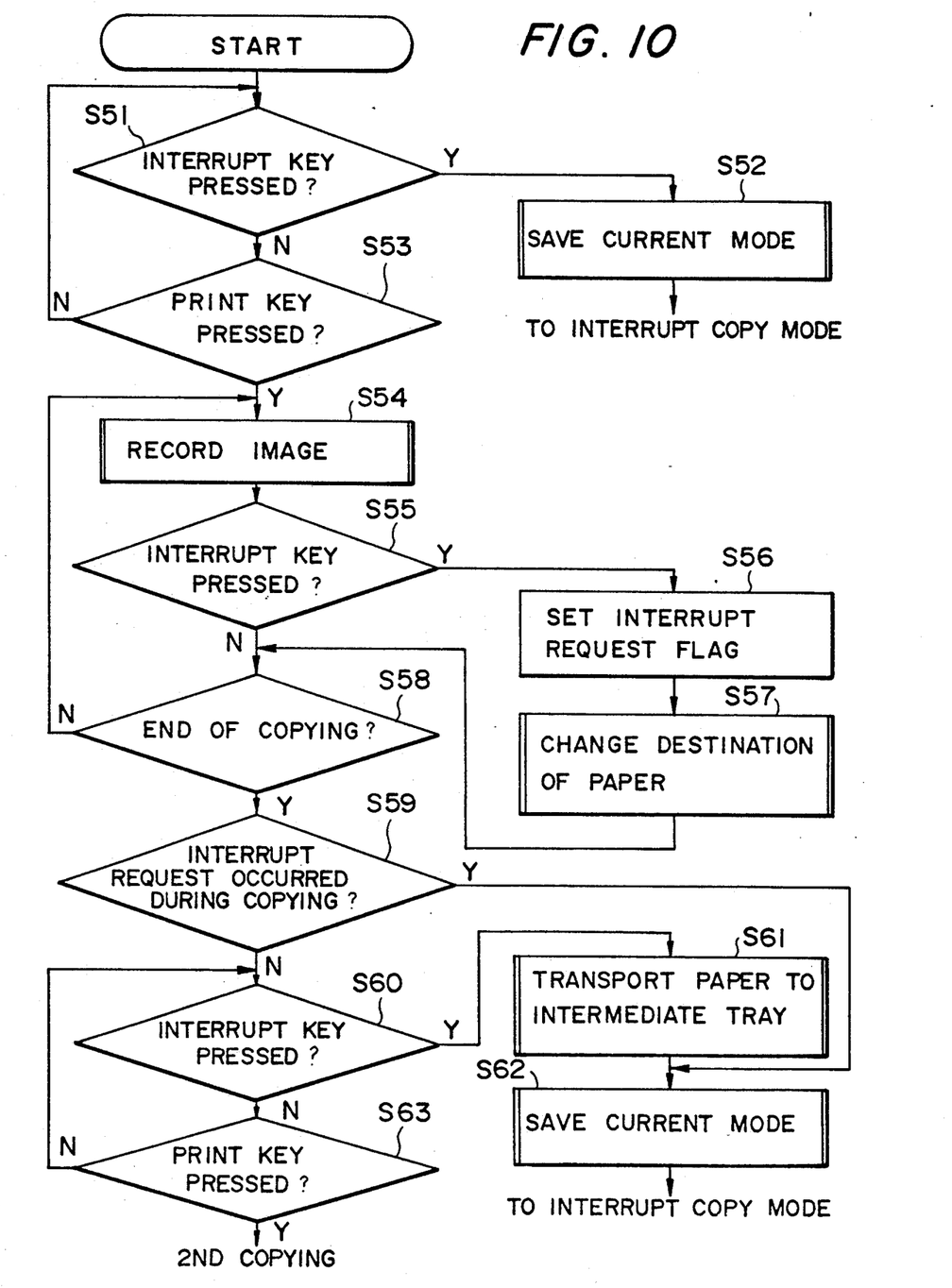
FIG. 10 is a flowchart demonstrating a specific composite copy mode and a specific two-sided copy mode available with the embodiment of FIG. 9.

FIG. 10 shows an operation of the main control board 59 of this embodiment for effecting a composite copy mode operation and a two-sided copy mode operation which is effected with a single paper sheet. As shown, the control board 59 checks, for example, the output of the composite copy mode key 73 and, when the key 73 is pressed, sets up the composite copy mode. The control board 59 checks the output of the two-sided copy mode key 74 and, when it is pressed, sets up the two-sided copy mode. In the composite copy mode, only one copy is produced at a time. While in a waiting state, the control board 59 checks the output of the interrupt key 65 to see if the key 65 has been pressed (S51). When the key 65 is pressed, the control board 59 saves the current copy mode and the statuses of the copier in the RAM 95 (S52), and then starts on the interrupt copy mode. At this instant, the control board 59 restores the copy mode to the initial one. Further, while in a waiting state, the control board 59 checks the output of the print key 62 to see if the key 62 has been pressed (S53). When the key 62 is pressed, the control board 59 controls the output section 100 to cause it start on the first copying operation (S54). While the copying operation is under way, the control board 59 determines whether or not the interrupt key 65 has been pressed (S55). If the answer of the step S55 is positive, the control board 59 sets an interrupt request flag (S56) and changes the destination of the paper sheet from the register roller 34 to the intermediate tray 49 (S57). Subsequently, the control board 59 determines whether or not the first copying operation has completed (S58), again sets up the standby state if the answer of the step S58 is positive, and then determines whether or not the interrupt key 65 has been pressed during the copying operation by referencing the interrupt request flag (S59). If the answer of the step S59 is positive, the control board 59 saves the copy mode and the statuses of the copier set in the step S62 in the RAM 95 (S62) and then starts on the interrupt copy mode.

By referencing the interrupt request flag, the control board 59 determines whether or not the interrupt key 65 has been pressed while in the standby state (S60). If the key 65 has been pressed, the control board 59 causes the paper sheet located at the register position or register roller 34 to be transported and stored in the intermediate tray 49, saves the current copy mode and the statuses of the copier in the RAM 95, and then starts on the interrupt copy mode. Further, the control board 59 determines whether or not the print key 62 has been pressed (S63) and, if it has been pressed, causes the second copying operation (on the rear of the paper sheet in the two-sided copy mode) to occur. After the interrupt copy mode operation, the control board 59 restores the copier to the original statuses on the basis of the data saved in the RAM 95 and resets the interrupt request flag.

In the composite copy mode, the control board 59 causes the rollers 46 and 47 to transport the paper sheet moved away from the selector 40 to the refeed roller 48 along the transport paths 43 and 45 and causes the paper sheet to stop there. To produce a single copy in the two-sided copy mode, the control board 59 causes the rollers 46 and 47 to transport the paper sheet from the selector 40 to the refeed roller 48 along the transport paths 43 and 45, and causes a selenoid, not shown, to position the selector 55 upward to thereby route the paper sheet to the intermediate tray 49 via the refeed roller 48. As a result, the paper sheet is received in the intermediate tray 49 as in the case where a plurality of copies are produced in the two-sided copy mode. Assuming that the interrupt key 65 is pressed in the waiting state after the first copying operation, then the control board 59 causes the roller 54 and refeed roller 48 to drive the paper sheet located at the register station or register roller 34 to the intermediate tray 49.

As stated above, this embodiment has interrupting means for interrupting, in response to an interrupt request, a job under way, and resuming the job after an interrupt mode copying operation, and an intermediate tray for accommodating a one-sided copy sheet produced in the two-sided or composite copy mode and refeeding it to the register roller 34. In response to an interrupt request in the two-sided or composite copy mode, the embodiment transports the paper sheet to be refed to a location other than one where the register roller 34 is located. This insures high productivity by eliminating an occurrence that the interrupt copy mode cannot be executed depending on the desired copy mode and the desired number of copies to be produced, while freeing the operator from confusion.

In summary, it will seen that the present invention provides a copier having various unprecedented advantages, as follows. Even when a document is reversed in position in the longitudinal and lateral directions, there is eliminated an occurrence that the actual number of copies is short of the set number of copies and an occurrence that more than the number of paper sheets accomodatable in an intermediate tray are received in the tray. So long as the documents are not changed in position and the number of paper sheets accommodatable in the intermediate tray is not changed, copies can be produced in an optimum magnification. Even when paper sheets is of a size which allows a greater number of paper sheets to be accommodated in the intermediate tray, it is not necessary to limit the maximum number of copies to be set to the number particular to the paper size which would minimize the number of paper sheets accommodatable in the intermediate tray, enhancing the productivity of copies. Moreover, the copying efficiency is enhanced since the copier is prevented from producing only the number of copies accommodatable in the intermediate tray by ignoring the set number of copies, i.e., the operator is prevented from failing to notice such a fact. In addition, the occurrence that an interrupt copy mode is inhibited due to the desired copy mode and the desired number of copies is eliminated, also insuring high productivity and freeing the operator from confusion.

Various modifications will become possible for those skilled in the art after receiving the teachings of the present disclosure without departing from the scope thereof.

What is claimed is:

1. A copier comprising:
a body for reproducing a document laid on a glass platen on a paper sheet;
paper selecting means for selecting the paper sheet;
magnification setting means for setting a magnification in which said body reproduces the document;
reporting means for reporting an operator a condition wherein a copying operation would be effected more effectively if the document were laid on the glass platen in a reversed position with respect to a longitudinal and a lateral direction thereof;
an intermediate tray for accommodating a paper sheet carrying an image formed by said body in a two-sided copy mode on one side thereof, and refeeding said paper sheet for causing an image to be formed on the other side of said paper sheet; and
suppressing means for suppressing a report by said reporting means when the number of paper sheets accommodatable in said intermediate tray would change if the document on the glass platen were changed in position in the longitudinal and lateral directions thereof.

2. A copier comprising:
a body for reproducing a document laid on a glass platen on a paper sheet;
magnification setting means for setting a magnification in which said body reproduces the document;
reporting means for reporting an operator a condition wherein a copying operation would be effected more effectively if the document were laid on the glass platen in a reversed position with respect to a longitudinal and a lateral direction thereof;
an intermediate tray for accommodating a paper sheet carrying an image on one side thereof in a two-sided copy mode effected by said body, and refeeding said paper sheet for causing an image to be formed on the other side of said paper sheet; and
magnification changing means for assigning a particular magnification to each of a condition wherein the number of paper sheets accommodatable in said intermediate tray would change if the document on the glass platen were changed in position in the longitudinal and lateral directions thereof and a condition other than said condition.

3. A copier comprising:
a body for reproducing a document on a set number of paper sheets:
paper selecting means for selecting the paper sheets;
an intermediate tray for accomodating paper sheets each carrying an image formed by said body on one side thereof, and then refeeding said paper sheets so that an image will be formed on the other side of said paper sheets, said intermediate tray accommodating a number of paper sheets which changes according to the paper size of said paper sheets; and copy control means for calculating a number of paper sheets accommodatable in said intermediate tray according to the selection by said paper selecting means and, if the set number of paper sheets is greater than the calculated number, interrupting, ending or continuing a copying operation of said body while reporting the interruption, end or continuation to an operator.

4. A copier as recited in claim 3, wherein the copier further comprises a display means, and wherein said interruption, end or continuation is reported to the operator via said display means.

* * * * *